May 22, 1962 T. A. ST. CLAIR 3,035,434
METER PROVER
Filed Oct. 27, 1959 5 Sheets-Sheet 1

INVENTOR
Theodore A. St. Clair

BY Johnson and Kline
ATTORNEYS

INVENTOR
Theodore A. St. Clair
BY Johnson and Kline
ATTORNEYS

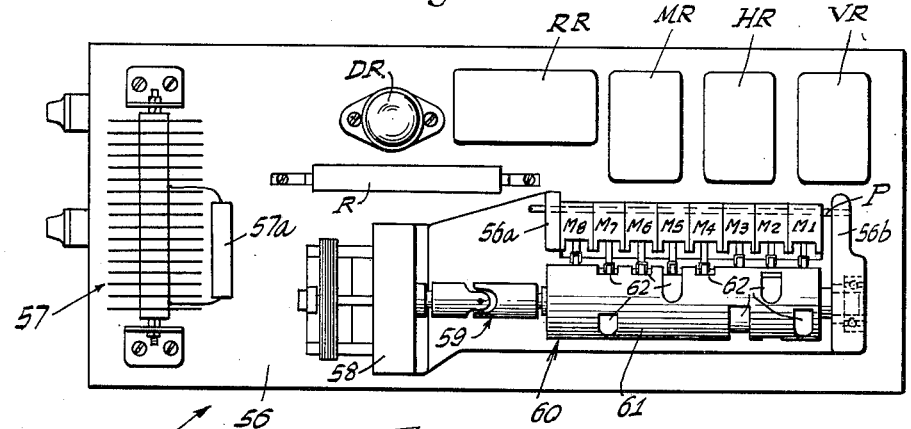
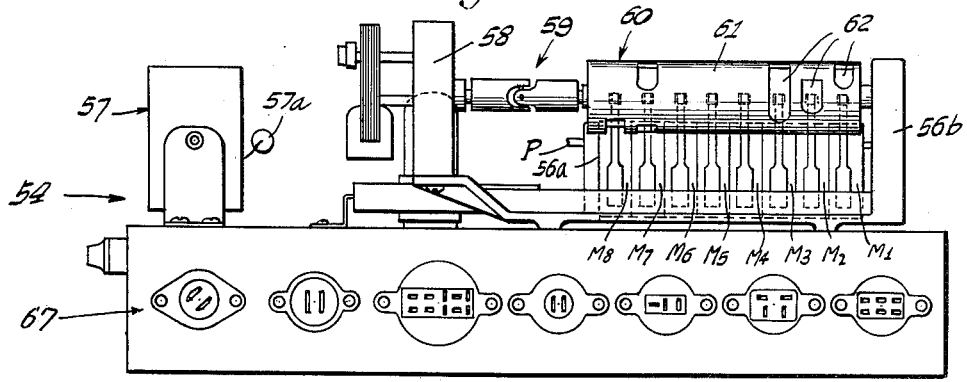
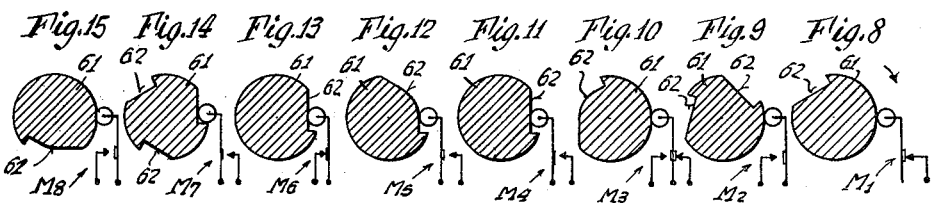
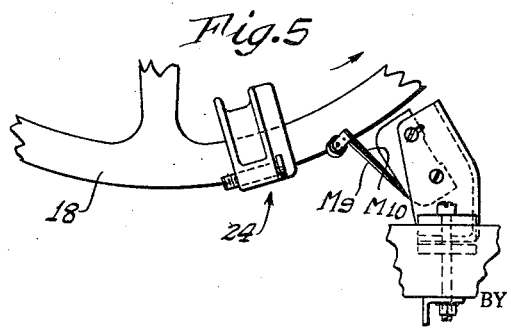

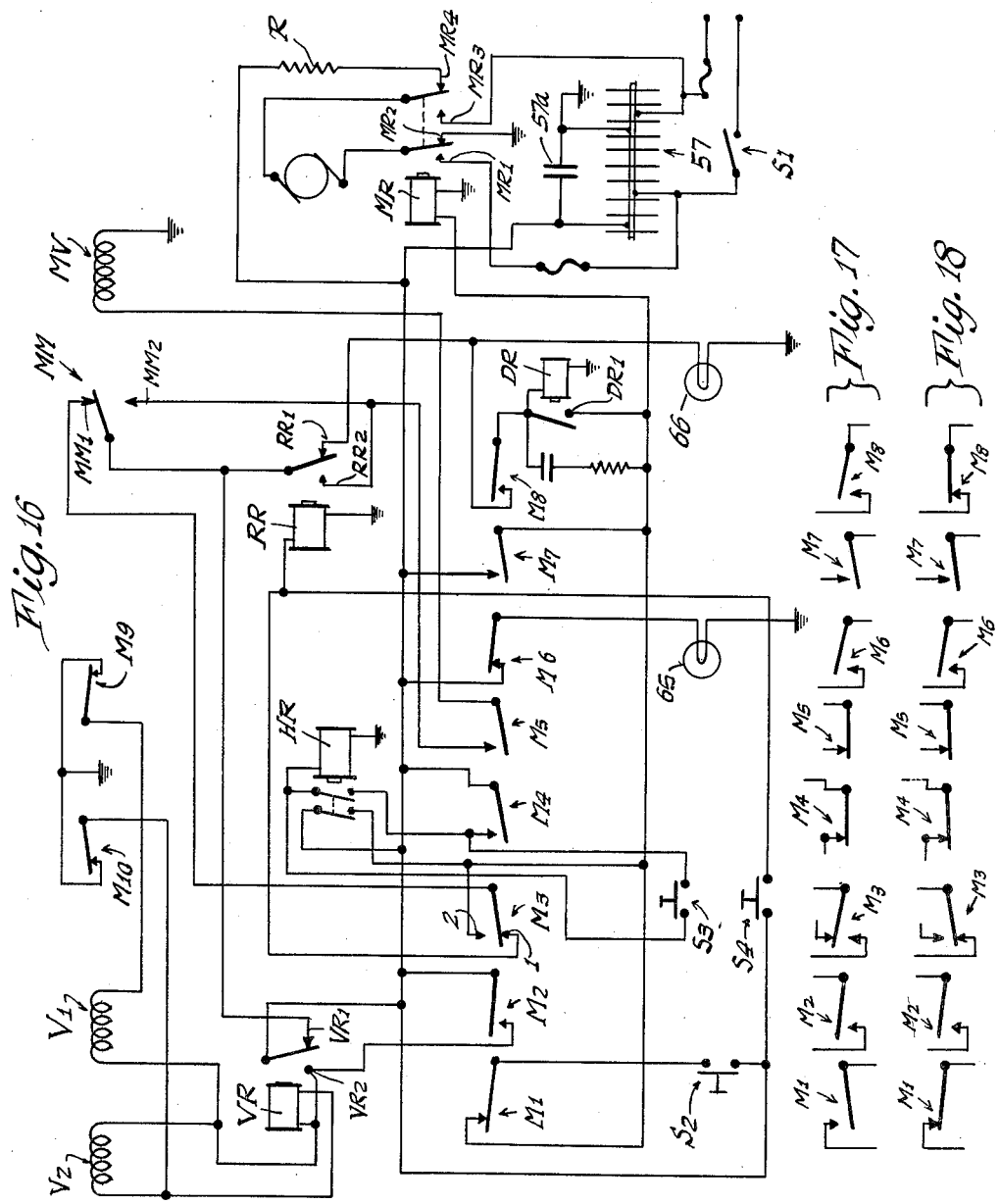

May 22, 1962

T. A. ST. CLAIR 3,035,434

METER PROVER

Filed Oct. 27, 1959

INVENTOR.
Theodore A. St. Clair
BY
Johnson and Kline
ATTORNEYS

United States Patent Office 3,035,434
Patented May 22, 1962

3,035,434
METER PROVER
Theodore A. St. Clair, Fairfield, Conn., assignor, by mesne assignments, to Textron, Inc., Providence, R.I., a corporation of Rhode Island
Filed Oct. 27, 1959, Ser. No. 849,004
7 Claims. (Cl. 73—3)

The present invention relates to an apparatus for proving the accuracy of a fluid meter, and more specifically for gas meters.

It is an object of the present invention to provide a proving device which simplifies the testing of meters and which automatically operates through a testing cycle to expedite the accurate testing of the meter and to reduce to a minimum the manual operations in connection therewith.

A feature of the invention involves a novel control system whereby the proving bell is first filled with a predetermined volume of gas and thereafter the bell is automatically connected to a meter to operate the meter through a predetermined cycle of operation to determine the volume of gas passing through said meter during said cycle.

A further feature of the invention resides in incorporating in the control circuit in the device means for initially purging the meter and thereafter testing the meter.

A still further feature of the invention resides in the inclusion in the control system of means for determining the proper position of the control drum and sequence switches to effect a proving operation and to provide means whereby said control drum and sequence switches can be manually actuated to the predetermined starting relation.

Other features and advantages of the invention will be apparent from the specification and claims when considered in connection with the accompanying drawings in which:

FIG. 5 is a fragmentary view of the cable wheel and microswitches for controlling the filled position of the prover bell.

FIG. 6 is a top view of the programming unit.

FIG. 7 is a side view of the programming unit.

FIGS. 8–15 are sectional views taken through the control drum at each of the microswitches positioned therealong and diagrammatically showing the circuit relation of the microswitch for the normal starting position of the control drum.

FIG. 16 is a wiring diagram of the control circuit with the microswitches in starting position.

FIG. 17 is a fragmentary view of the circuit showing the positions of the microswitches in the second position of the control drum.

FIG. 18 is a view similar to FIG. 17 showing the microswitches in the third position of the control drum.

Figure 1:
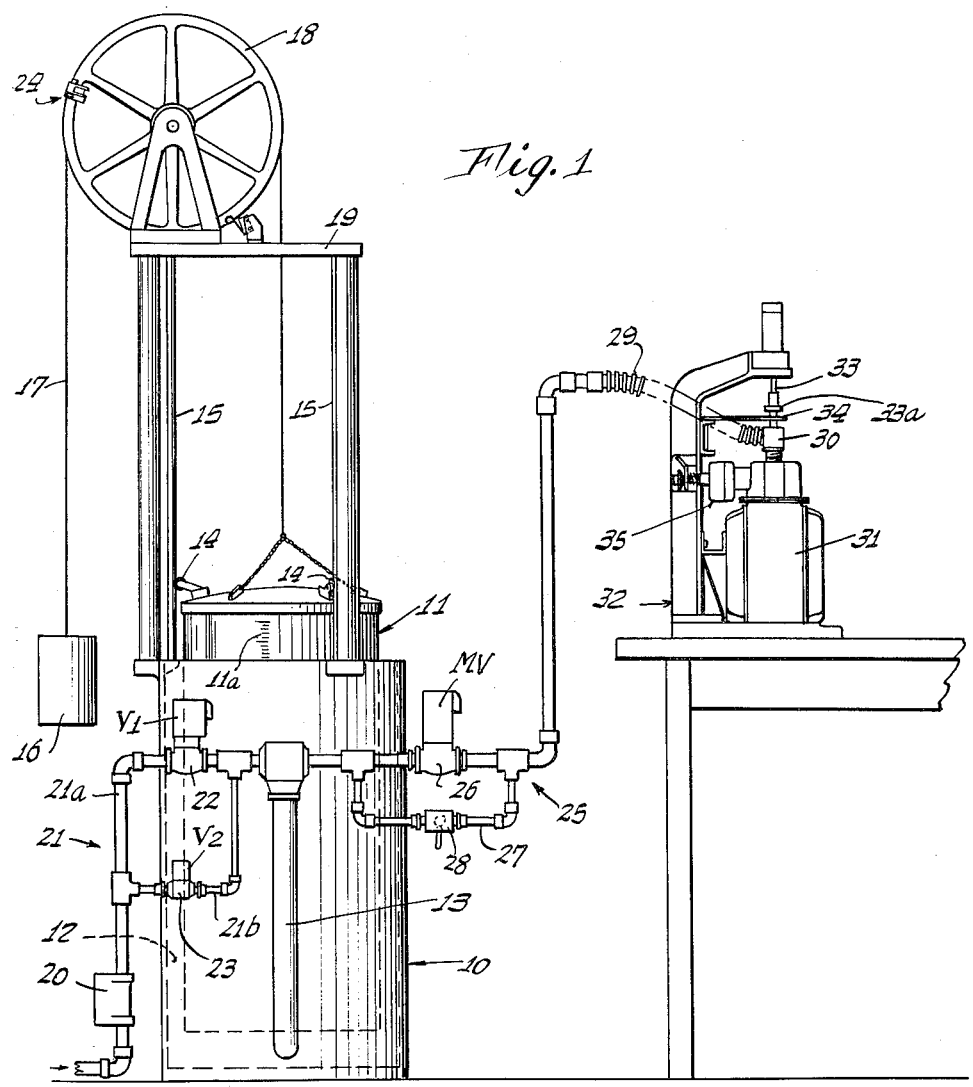
FIGURE 1 shows a view of the proving device.

The meter prover device of the present invention comprises a tank 10 having a bell 11 mounted therein for vertical movement. The space 12 between the tank and bell is filled with a fluid, such as oil, and the tank has connected thereto a pipe 13 through which air can be admitted to the bell or discharged from the bell to the meter as will be explained. The bell has a scale 11a on the surface to indicate the volume of air in the bell in the various positions thereof. As the bell is filled with air, it lifts vertically and is guided in its vertical movement by rollers 14 mounted on the top of the bell and cooperating with the guide rails 15 disposed above the tank. A counterweight 16 is connected by a cable, chain or the like 17 to the top of the bell, which cable passes over a wheel 18 mounted on an upper platform 19 disposed over the bell. Air is fed to pipe 13 from a source (not shown) through a filter 20 to a branched pipe line 21, the upper line 21a including the main valve 22 operated by a solenoid V1 and line 21b being provided with a vernier valve 23 operated by a solenoid V2. The solenoids are controlled by a pair of micro-switches M9, M10 mounted on the platform 19 in position to be engaged by dog means 24 adjustably mounted on the wheel when the wheel has been rotated by the cable as the bell is lifted to the proper position by the volume of air therein. The microswitches are so arranged that microswitch M9 for controlling the solenoid V1 is first actuated by the dog to close the main traverse valve when the bell approaches the end of its upward stroke. Thereafter the vernier valve feeds air at a slow rate to bring the bell to its proper position at which time the dog engages the microswitch M10 to close the vernier valve to properly stop the bell when a predetermined volume of air is in the bell.

The bell is adapted to be connected to the meter to be tested through a line 25 connected to line 13. The flow of air through the line 25 is controlled by a meter valve 26 having a solenoid MV to control the same. If desired, the line 25 may have a bypass 27 around the valve 26 which bypass includes the manually operated valve 28 which may be operated for manually controlling the feed of air to the meter for set-up or other adjustments.

The line 25 is connected by suitable means such as a flexible hose 29 to a fitting 30 which is adapted to be mounted on the inlet port of the meter with the hose connected to the inlet port of the meter 31 to be tested. The fitting is carried by a meter-receiving stand 32 and is normally pressed into engagement by a pneumatically actuated rod 33. A stop 34 is provided for engaging a collar 33a on rod 33 and preventing the fitting from dropping too far below the required position.

Figure 2:
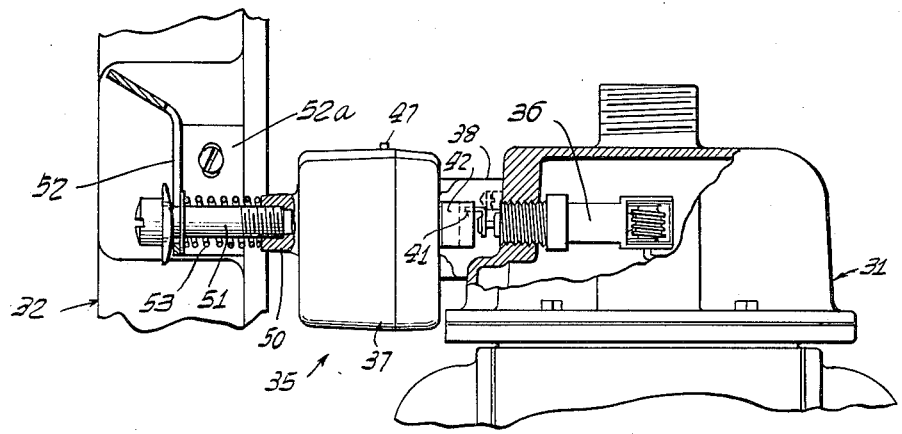
FIG. 2 shows a view partly in section of the meter sensing unit in relation to the meter.
Figure 3:
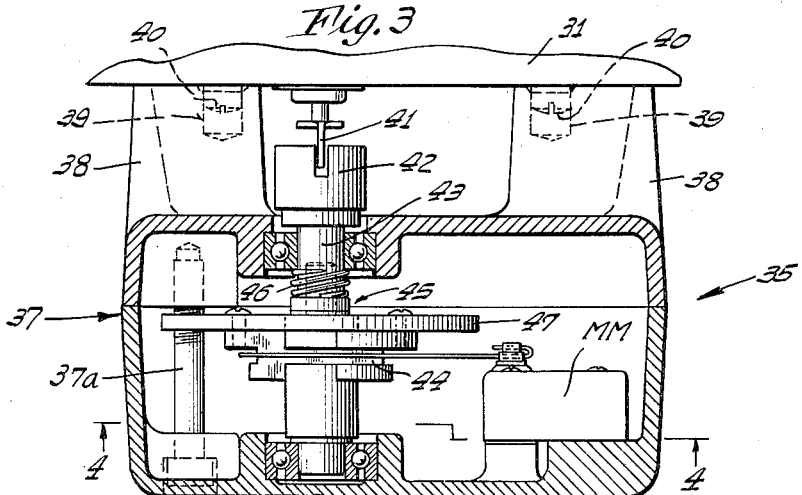
FIG. 3 is a transverse sectional view of a meter sensing device of FIG. 2.
Figure 4:
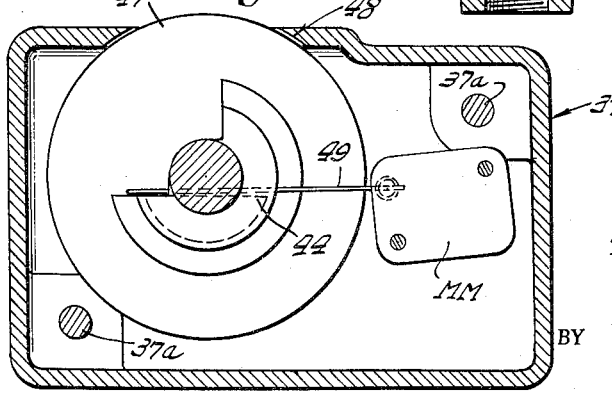
FIG. 4 is a sectional view taken along lines 4—4 of FIG. 3.

The stand also carries a meter sensing device or unit 35 for controlling the meter valve. As shown in FIG. 2–4, the device is adapted to be driven from the usual register operating shaft 36 of the meter to accurately control the proving operation in response to the displacement of the diaphragm (not shown) in the meter as indicated by the register. The meter sensing device comprises a two-part housing 37 bolted together by bolts 37a. The housing has a pair of lugs 38 projecting from the face and having locating recesses 39 adapted to engage studs 40 on the front of the top of the meter to locate the sensing unit in position thereon in which the driving tongue 41 of the registered device in in position to be engaged by the female socket 42 on the shaft 43 of said device. The shaft can be turned so that the drive elements can be positioned to cooperate as shown in FIG. 3. A cam disk 44 is mounted on the shaft and driven by means of a friction clutch 45 controlled by the spring 46 and has an enlarged finger wheel 47 connected thereto and projecting through an opening 48 in the housing whereby the position of the cam disk on the shaft can be adjusted as required. Mounted within the housing is the meter microswitch MM which has an actuator 49 projecting therefrom and engaging the cam disk carried by the shaft to be actuated thereby. The housing is mounted on the meter stand by means of a boss 50 projecting from the front thereof into which is threaded a bolt 51 which is slidably carried in a slot 52 in a bracket 52a adjustably carried by the vertical part of the stand 32 so that the device is in position to readily engage the studs on the meter. A spring 53, disposed on the bolt between the bracket and meter sensing device, normally urges the unit into engagement with the top of the meter; yet will permit the sensing unit to be withdrawn from the meter quickly. The bolt is slidable in the slot in the meter-receiving stand so that the unit can be adjusted vertically with respect to the meter to accommodate meters of various heights and also moved to an upwardly disposed out-of-the-way position.

Means are provided in accordance with the present invention for coordinating the operation of the prover bell and meter valve so as to perform a complete proving operation automatically. To this end a novel programming device 54 and a controller device 55 therefor is provided. The programming device is shown in FIGS. 6 and 7 and comprises a base 56 having mounted thereon a rectifier 57 and connected condenser 57a providing a D.C. supply. Also mounted on the base is an alternating current motor 58 adapted to be connected to an A.C. supply. The motor, through a universal drive 59, drives a programming drum 60 which is adapted to have three rotative positions in which it is stopped by D.C. braking current applied to the motor through resistor R from the D.C. supply. The motor is controlled by motor relay MR as will be explained. In the form of the invention disclosed herein, the drum is a cylindrical member 61 having relieved portions 62 disposed in the surface thereof in predetermined spaced relation to provide high and low portions adapted to cooperate with eight microswitches M1, M2, M3, M4, M5, M6, M7, M8 arranged in a line parallel to the axis of the drum and removably held in position by pins P passing through aligned apertures in the switches and in the brackets 56a, 56b, the operator for each microswitch being disposed so as to be controlled by the drum and relieved portions thereof. In order to clearly illustrate the relationship of the drum and its relieved portions with respect to the microswitch operators, sectional views taken through the drum and each actuator for the eight microswitches, with the drum in start position, are shown in FIGS. 8–15, with the switches diagrammatically illustrated therein and the direction of rotation indicated by the arrow in FIG. 8. The other two positions of the drum occur upon successive rotations of the drum through 120°.

Also mounted on the base are the various relays DR, MR, HR, RR, VR and resistor R used in the programming circuit. The microswitches control the various sequences of operation of filling the prover bell, connecting the meter to the prover bell, and carrying out a cycle of operation as will be explained.

Figure 19:
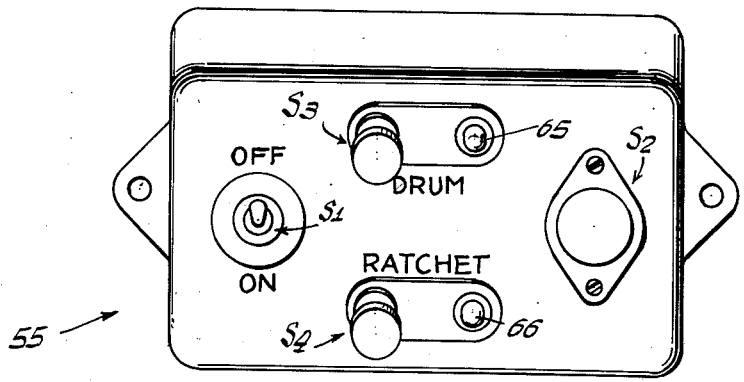
FIG. 19 is a top view of the controller unit.
Figure 20:
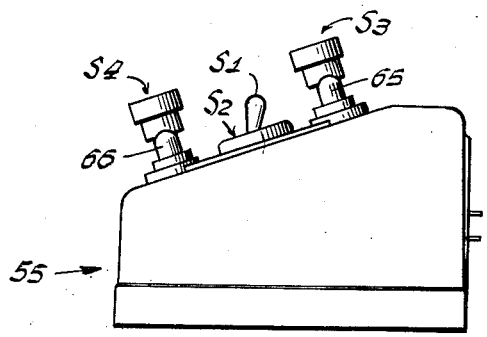
FIG. 20 is an end view of said controller unit.

The control device as shown in FIGS. 19 and 20 comprises a housing having mounted thereon an "off" and "on" power switch S1 for supplying A.C. power to the programming device, a normally open start switch S2, a normally open drum switch S3 and a normally open ratchet relay operating switch S4. Also, the device has thereon a drum pilot light 65 and ratchet relay pilot light 66.

The various elements of the control device, meter sensing device and prover device are connected by jumpers (not shown) to the receptacles in the receptacle panel 67 on the face of the base as shown in FIG. 7. The wiring diagram of FIG. 16 shows the elements in their electrically connected relation and can be best understood from a description of a cycle of operation.

Before any test cycle is started, however, it is essential that the programming means be in an initial starting position in which the drum 61 and ratchet relay RR are in proper starting relation. When the drum is in proper starting position, the signal light 65 which is connected to the microswitch M6 will be energized. If the circuit to the light 65 is opened at microswitch M6 because the drum is out of starting position, the switch S3 is then momentarily closed. This energizes motor relay MR and starts the drum rotating and also energizes the holding relay HR which establishes a holding circuit through microswitch M4 and maintains the circuit to the motor closed, after the release of the momentary operation of switch M3, until the proper position of the drum is achieved as determined by the drum microswitch M7. If the ratchet relay is in proper sequence with contact RR1 closed, the light 66 is energized through contact VR1. If the ratchet relay light is not energized, the sequence switch S4 is closed momentarily, thus energizing the ratchet relay and causing the relay to be stepped and the contact to be opened at RR2 and closed at RR1. The programming means is now ready to start a cycle of operation.

To start the cycle, the power switch S1 which has been closed connects the programming unit to a source of alternating current and also energizes the D.C. supply produced by the rectifier 57. The programming drum is in its normal start position as shown in FIG. 16. Start switch S2 is momentarily closed and through the closed microswitch M1, energizes motor relay MR and connects the motor through contacts MR1, MR3 to the source of alternating current to rotate the programming drum from the start position. As the drum turns it will be seen from FIG. 14 that microswitch M7 will close and even though switch S2 has been released the motor will continue to turn the drum until it reaches its second position at which time the programming drum opens the switch M7, de-energizing the relay MR which moves to the position shown in FIG. 16 wherein the motor is connected through contacts MR2, MR4 to the D.C. current source through resistance R to brake it and stop it in its second position.

As the programming drum moves from its start position it momentarily closes the microswitch M2 (see FIG. 9) energizing valve relay VR and the solenoids V1, V2 for operating the prover valves 22, 23 which solenoids are connected to ground through microswitches M9 and M10. Operation of the valve relay VR opens the normally closed contact VR1 and closes the contact VR2 to provide a holding circuit for the relay for maintaining the relay operative after the momentary closing of the switch M2 is completed. Energization of the solenoids V1 and V2 will open the main and vernier valves and cause the air to be fed into the prover tank. As the prover tank is filled it rises and causes the wheel 18 to bring the stop dogs 24 into position wherein the microswitch M9 is engaged and opened. This deenergizes the circuit to the solenoid V1, which closes the main valve 22, and permits the vernier valve 23 to supply air at a very low rate to slowly move the bell to its final position in which position the stop dog 24 on the wheel engages the microswitch M10 to open the circuit to solenoid V2, close valve 23, and stop the feeding of air to the prover chamber. The opening of the circuit at M10 also removes the ground from the valve relay VR and deenergizes the relay. This opens the holding circuit and closes the normally closed contact VR1 as shown in FIG. 16.

With the drum in its second position the microswitches will be actuated, as shown in FIG. 17, the solenoid MV for the meter valve will be energized through the closed contacts of microswitch M5 and through contact MM2 of the meter microswitch MM contacts which are held in closed position by the cam in the meter sensing device, which has been moved from stop position to effect a purge of the meter or to establish the starting position. This causes the meter valve to open and feed air from the tank to the meter. Rotation of the register shaft of the meter in response to the flow of air therein will cause the cam to rotate and after a predetermined operation will cause operator 49 to open contact MM2 and close the contact MM1. This opens the circuit to the solenoid MV of the meter valve, closing the valve and stopping the flow of air to the meter. Closing of contact MM1 completes the circuit motor relay MR through contact 2 of microswitch M3 and causes the drum to rotate to the third position in which microswitches are actuated as shown in FIG. 18 and in which the rotation is stopped by the opening of contact 2 of microswitch M3 and microswitch M7. As the drum rotates to the third position, switch M2 is momentarily closed and the cycle of filling the prover bell is carried out and upon completion the relay is deenergized and contact VR1 is again closed and a circuit is established to ratchet relay RR which will close contact RR2 and complete the circuit to solenoid MV through contacts of M5 and the meter will start its "official" run. After a few degrees of rotation of the cam the switch MM will be actuated to open contact MM1 releasing the current from the ratchet relay RR and simultaneously close contact MM2 so as to continually hold the valve open. After 360° of rotation of the cam in the meter sensing unit, the circuit will be broken at contact MM2 and when the ratchet relay RR is energized the meter valve will close. At this time the volume of gas which has passed from the bell can be noted from the scale 11a to determine the accuracy of the meter. Since circuit to the ratchet relay will be closed through contact MM1 and contact 1 of M3 the relay RR will be stepped and establish a connection at the contact RR1 which closes a circuit to the delay relay DR which, after a delay of about three seconds, will operate and close the circuit through contact DR1, M8 to the motor relay MR to again start the motor and bring the drum to its starting position in which position it is stopped by the opening of M7 and M8.

Usually it is desirable to prove the meter by using two different rates of flow and this can be accomplished in the present invention by changing the rate of flow at the end of the first proving operation by varying the rate of discharge of air from the meter by suitable means (not shown) mounted on the outlet port of the meter. The programming mechanism having completed the first run is in the proper position for a second run with the drum and ratchet switch in proper sequenced positions and the lights 65, 66 energized and the meter register shaft will be in proper starting position.

The start switch S1 is pressed and the valve relay VR is operated and the prover bell is filled with air at which time M10 is operated to deenergize VR and close contact VR1. Upon the closing of VR1 current will then pass through contacts 2 of microswitch M3 and energize the motor relay MR and move the drum from the second position. Since the switches of the prover microswitches are open, relay VR will not be operated and the drum will immediately move into the third position. In the third position current will be applied through MM1 to the ratchet relay RR which will close the circuit to contact RR2 thereof to re-energize the meter valve MV through microswitch M5. Upon the 360° rotation of the meter register shaft, the contacts between MM2 will be opened and will instantly close the circuit to MM1 and will energize the coil and ratchet through meter microswitch and close the meter valve. At this point contacts RR1 of the ratchet relay will be closed and through microswitch M8 the time delay relay DR will be energized. At the end of approximately 3 seconds, the contact of the delay relay DR will close and current will be applied to the motor relay MR and the drum will be returned to its starting positions.

Variations and modifications may be made within the scope of the claims and portions of the improvements may be used without others.

I claim:

1. Prover means for gas operated meters comprising a prover bell adapted to be filled with a predetermined quantity of gas; means including prover valve means connecting said bell to a source of gas; means including meter valve means connecting said bell to a meter to be tested; and means controlling the filling of the prover bell and the feeding of gas to the meter in a predetermined sequence comprising a programming unit having a rotatable member, means for rotating the member from a starting position through a cycle of rotative positions, and a plurality of electrical switches operated by the member in the plurality of rotative positions of the member; means controlled by at least one of said switches for operating the prover valve means to fill the bell; means rendering the last-named means inoperative and closing the prover valve means upon the bell being filled with a predetermined volume of gas; means controlled by at least another one of said switches and rendered operative upon the filling of the bell for operating the meter valve to feed gas from the bell to the meter to operate the meter; and meter sensing means driven by the meter and electrically connected to the programming unit for rendering the last-named means inoperative and closing the meter valve after a predetermined operation of the meter and for returning the member to starting position.

2. Prover means for gas operated meters comprising a prover bell adapted to be filled with a predetermined quantity of gas; means including prover valve means connecting said bell to a source of gas; means including meter valve means connecting said bell to a meter to be tested; and means controlling the filling of the prover bell and the feeding of gas to the meter in a predetermined sequence comprising a programming unit having a rotatable drum, means for rotating the drum through a cycle of 360°, a plurality of electrical switches detachably mounted on the programming unit and operated by the drum in a plurality of rotative positions of the drum and a ratchet relay for controlling the sequence of the operation of the valve means; means controlled by at least one of said switches for operating the prover valve means to fill the bell; means rendering the last-named means inoperative and closing the prover valve means upon the bell being filled with a predetermined volume of gas; means controlled by at least another one of said switches and rendered operative upon the filling of the bell for operating the meter valve to feed gas from the bell to the meter to operate the meter; meter sensing means driven by the meter and connected to the programming unit for rendering the last-named means inoperative and closing the meter valve after a predetermined operation of the meter and for returning the drum to starting position; and a controller unit electrically connected to the programming unit and comprising a start switch for starting a cycle of operation, an indicator for indicating the position of the drum and a manually operated switch for operating the drum to start position in the event the drum is out of said position and an indicator showing the sequenced position of the ratchet relay and a manually operated switch for actuating the relay to proper sequenced position for starting a cycle.

3. Prover means for gas operated meters comprising a prover bell adapted to be filled with a predetermined quantity of gas; valve means connecting said bell to a source of gas; means connecting said bell to a meter to be tested and including a meter valve means and a meter sensing unit; and means controlling the filling of the prover bell and the feeding of gas to the meter in a predetermined sequence comprising a programming unit having a rotatable member and a plurality of electrical switches operated by the member in a plurality of rotative positions of the member from a starting position, means controlled by at least one of said switches for operating the prover valve means to fill the bell, means rendering the last-named means inoperative and closing the prover valve means upon the bell being filled with a predetermined volume of gas, means controlled by at least another one of said switches and rendered operative upon the filling of the bell for operating the meter valve to feed gas from the bell to the meter to operate the meter, said meter sensing unit being connected to the programming unit and having a cam driven by the meter and operating a switch means therein for closing the meter valve after a predetermined operation of the meter, and for returning the member to starting position.

4. Prover means for gas operated meters having a rotatable register shaft driven thereby comprising a prover bell adapted to be filled with a predetermined quantity of gas; means including magnetically controlled meter valve means connecting said bell to a meter to be tested; means including a programming unit for controlling the meter valve means; and meter sensing means driven by the meter and connected to the programming unit for closing the meter valve after a predetermined operation of the meter, said means comprising a housing having a rotatable control shaft, means coupling said control shaft to said register shaft to be driven thereby, cam means on the control shaft, and switch means actuated by the cam means for controlling the magnetic valve means.

5. Prover means for gas operated meters having a rotatable register shaft driven thereby comprising a prover bell adapted to be filled with a predetermined quantity of gas; means including magnetically controlled meter valve means connecting said bell to a meter to be tested; means including a programming unit for controlling the meter valve; and meter sensing means driven by the meter and connected to the programming unit for closing the meter valve after a predetermined operation of the meter, said means comprising a housing having a rotatable control shaft, means coupling said shaft to said register shaft to be driven thereby, cam means frictionally connected to the control shaft and having means projecting from the housing whereby said cam means can be adjusted with respect to the shaft, and switch means actuated by the cam means for controlling the magnetic valve means after a predetermined operation of said meter.

6. Prover means for gas operated meters having a rotatable register shaft driven thereby comprising a prover bell adapted to be filled with a predetermined quantity of gas; means including magnetically controlled meter valve means connecting said bell to a meter to be tested; means including a programming unit for controlling the meter valve; meter sensing means driven by the meter and electrically connected to the programming unit for closing the meter valve after a predetermined operation of the meter, said means comprising a housing having a rotatable control shaft, means coupling said control shaft to said register shaft to be driven thereby, cam means on the control shaft, and switch means actuated by the cam means for controlling the magnetic valve means; and means for mounting the meter sensing means in position to cooperate with said meter comprising a stand and means yieldably mounting said housing on the stand for movement into and out of operative relation with said meter.

7. Prover means for gas operated meters comprising a prover bell adapted to be filled with a predetermined quantity of gas; means including solenoid operated prover valve means connecting said bell to a source of gas; means including solenoid operated meter valve means connecting said bell to a meter to be tested; and means controlling the filling of the prover bell and the feeding of gas to the meter in a predetermined sequence comprising a programming unit having a base, a rotatable drum having a recessed surface mounted on the base, means mounted on the base for rotating said drum, a plurality of electrical switches detachably mounted on the base adjacent the drum to be operated by the recessed surface of the drum in a plurality of rotative positions of the drum, a plurality of relays including a ratchet relay, mounted on the base and connected to said switches, means including one of said relays controlled by at least one of said switches for energizing the solenoids for the prover valve means and opening the prover valve means to fill the bell, means rendering the last-named means inoperative and closing the prover valve means upon the bell being filled with a predetermined volume of gas, means controlled by another of said relays and at least another one of said microswitches for rendering the meter valve operative to feed gas from the bell to the meter to operate the meter upon the filling of the bell, meter sensing means driven by the meter and electrically connected to the ratchet relay and at least one of the microswitches of the programming unit for rendering the last-named means inoperative and closing the meter valve after a predetermined operation of the meter and for returning the drum to starting position.

References Cited in the file of this patent

UNITED STATES PATENTS

| | | |
|---|---|---|
| 1,570,300 | Gase | Jan. 19, 1926 |
| 2,561,904 | Burch | July 24, 1951 |
| 2,702,149 | Harrison | Feb. 15, 1955 |
| 2,723,844 | Thurston | Nov. 15, 1955 |
| 2,931,216 | Rauth | Apr. 5, 1960 |
| 2,934,939 | Beckwith | May 3, 1960 |

UNITED STATES PATENT OFFICE
CERTIFICATE OF CORRECTION

Patent No. 3,035,434                          May 22, 1962

Theodore A. St. Clair

It is hereby certified that error appears in the above numbered patent requiring correction and that the said Letters Patent should read as corrected below.

Column 5, line 1, after "circuit" insert -- to --.

Signed and sealed this 11th day of September 1962.

(SEAL)
Attest:

ERNEST W. SWIDER
Attesting Officer

DAVID L. LADD
Commissioner of Patents